(12) United States Patent
Trott et al.

(10) Patent No.: US 7,945,496 B2
(45) Date of Patent: May 17, 2011

(54) REFERENCE PRICE FRAMEWORK

(75) Inventors: Douglas Trott, Toronto (CA); Jeffrey Marsden, Toronto (CA); Patrick Kennedy, Toronto (CA); Christopher May, Toronto (CA)

(73) Assignee: Pricemetrix, Inc., Toronto, Ontario (CA)

( * ) Notice: Subject to any disclaimer, the term of this patent is extended or adjusted under 35 U.S.C. 154(b) by 169 days.

(21) Appl. No.: 11/550,620

(22) Filed: Oct. 18, 2006

(65) Prior Publication Data

US 2008/0097886 A1    Apr. 24, 2008

(51) Int. Cl.
   *G06Q 40/00*    (2006.01)
(52) U.S. Cl. .......................................... 705/35; 705/26
(58) Field of Classification Search .................... 705/26, 705/35
   See application file for complete search history.

(56) References Cited

U.S. PATENT DOCUMENTS

| | | | |
|---|---|---|---|
| 6,205,433 B1 | 3/2001 | Boesch et al. | |
| 6,226,625 B1 | 5/2001 | Levenstein | |
| 6,526,392 B1 | 2/2003 | Dietrich et al. | |
| 6,553,350 B2 * | 4/2003 | Carter | 705/20 |
| 6,553,352 B2 * | 4/2003 | Delurgio et al. | 705/400 |
| 6,928,416 B1 | 8/2005 | Bertash | |
| 6,963,854 B1 * | 11/2005 | Boyd et al. | 705/37 |
| 6,978,257 B1 | 12/2005 | Halbout et al. | |
| 7,028,006 B1 | 4/2006 | Marsden et al. | |
| 7,092,918 B1 * | 8/2006 | Delurgio et al. | 705/400 |
| 7,133,848 B2 * | 11/2006 | Phillips et al. | 705/400 |
| 7,240,019 B2 * | 7/2007 | Delurgio et al. | 705/10 |
| 7,249,031 B2 * | 7/2007 | Close et al. | 705/20 |
| 7,249,032 B1 * | 7/2007 | Close et al. | 705/20 |
| 7,249,033 B1 * | 7/2007 | Close et al. | 705/10 |
| 7,302,410 B1 * | 11/2007 | Venkatraman et al. | 705/35 |
| 7,343,319 B1 * | 3/2008 | Walker et al. | 705/21 |
| 7,343,325 B2 * | 3/2008 | Shaver et al. | 705/26 |
| 7,379,922 B2 * | 5/2008 | Pericle | 705/400 |
| 7,392,228 B2 * | 6/2008 | Ternoey et al. | 705/400 |
| 7,447,646 B1 * | 11/2008 | Agarwal et al. | 705/26 |
| 7,451,106 B1 * | 11/2008 | Gindlesperger | 705/37 |
| 7,454,367 B2 * | 11/2008 | Yu et al. | 705/26 |
| 7,461,023 B1 * | 12/2008 | Helweg | 705/37 |
| 7,523,047 B1 * | 4/2009 | Neal et al. | 705/10 |
| 7,603,286 B2 * | 10/2009 | Ouimet | 705/10 |
| 7,617,119 B1 * | 11/2009 | Neal et al. | 705/10 |
| 2001/0032116 A1 * | 10/2001 | Hyatt | 705/10 |
| 2002/0116348 A1 * | 8/2002 | Phillips et al. | 705/400 |
| 2003/0014325 A1 * | 1/2003 | Biffar et al. | 705/26 |
| 2003/0158784 A1 * | 8/2003 | Shaver et al. | 705/26 |
| 2003/0177103 A1 * | 9/2003 | Ivanov et al. | 705/400 |
| 2003/0217016 A1 * | 11/2003 | Pericle | 705/400 |
| 2003/0225593 A1 * | 12/2003 | Ternoey et al. | 705/1 |
| 2004/0049470 A1 * | 3/2004 | Ouimet | 705/400 |

(Continued)

*Primary Examiner* — Jagdish N Patel
*Assistant Examiner* — Sara Chandler
(74) *Attorney, Agent, or Firm* — Locke Lord Bissell & Liddell LLP

(57) ABSTRACT

A method of computer-assisted price modeling is provided, which uses a reference price to assist in evaluating discretionary pricing of transactional services provided (i) by a professional among his own transactions or (ii) by a target professional among others' transactions. A universe of pricing episode data is segmented into groupings based on price predictive parameters. These data are then arranged in each grouping according to price. A reference price is determined within each grouping based on a predetermined level, rank or percentile. This reference price can then be used to evaluate the pricing episode data and provide various calculations or comparisons, including the revenue opportunity that could have been obtained by pricing at the reference price.

21 Claims, 3 Drawing Sheets

U.S. PATENT DOCUMENTS

| | | | | |
|---|---|---|---|---|
| 2004/0267674 | A1* | 12/2004 | Feng et al. | 705/400 |
| 2004/0267676 | A1* | 12/2004 | Feng et al. | 705/400 |
| 2005/0071249 | A1* | 3/2005 | Nix et al. | 705/26 |
| 2005/0137936 | A1* | 6/2005 | Roman et al. | 705/20 |
| 2005/0149458 | A1* | 7/2005 | Eglen et al. | 705/400 |
| 2005/0159974 | A1* | 7/2005 | Moss et al. | 705/1 |
| 2005/0160004 | A1* | 7/2005 | Moss et al. | 705/14 |
| 2005/0197851 | A1* | 9/2005 | Veit | 705/1 |
| 2005/0197902 | A1* | 9/2005 | Veit | 705/14 |
| 2005/0197941 | A1* | 9/2005 | Veit | 705/35 |
| 2005/0240531 | A1* | 10/2005 | Wolff | 705/53 |
| 2005/0256778 | A1* | 11/2005 | Boyd et al. | 705/26 |
| 2005/0261963 | A1* | 11/2005 | McLaughlin et al. | 705/14 |
| 2005/0288962 | A1 | 12/2005 | Boyd et al. | |
| 2006/0004598 | A1* | 1/2006 | Boyd et al. | 705/1 |
| 2006/0047608 | A1* | 3/2006 | Davis et al. | 705/400 |
| 2006/0161504 | A1* | 7/2006 | Walser et al. | 705/400 |
| 2006/0195345 | A1* | 8/2006 | Close et al. | 705/7 |
| 2006/0206385 | A1* | 9/2006 | Walker et al. | 705/21 |
| 2006/0206386 | A1* | 9/2006 | Walker et al. | 705/21 |
| 2007/0143171 | A1* | 6/2007 | Boyd et al. | 705/10 |
| 2007/0226064 | A1* | 9/2007 | Yu et al. | 705/20 |
| 2008/0077459 | A1* | 3/2008 | Desai et al. | 705/7 |
| 2009/0106100 | A1* | 4/2009 | Mashinsky | 705/14 |

* cited by examiner

Figure 3:
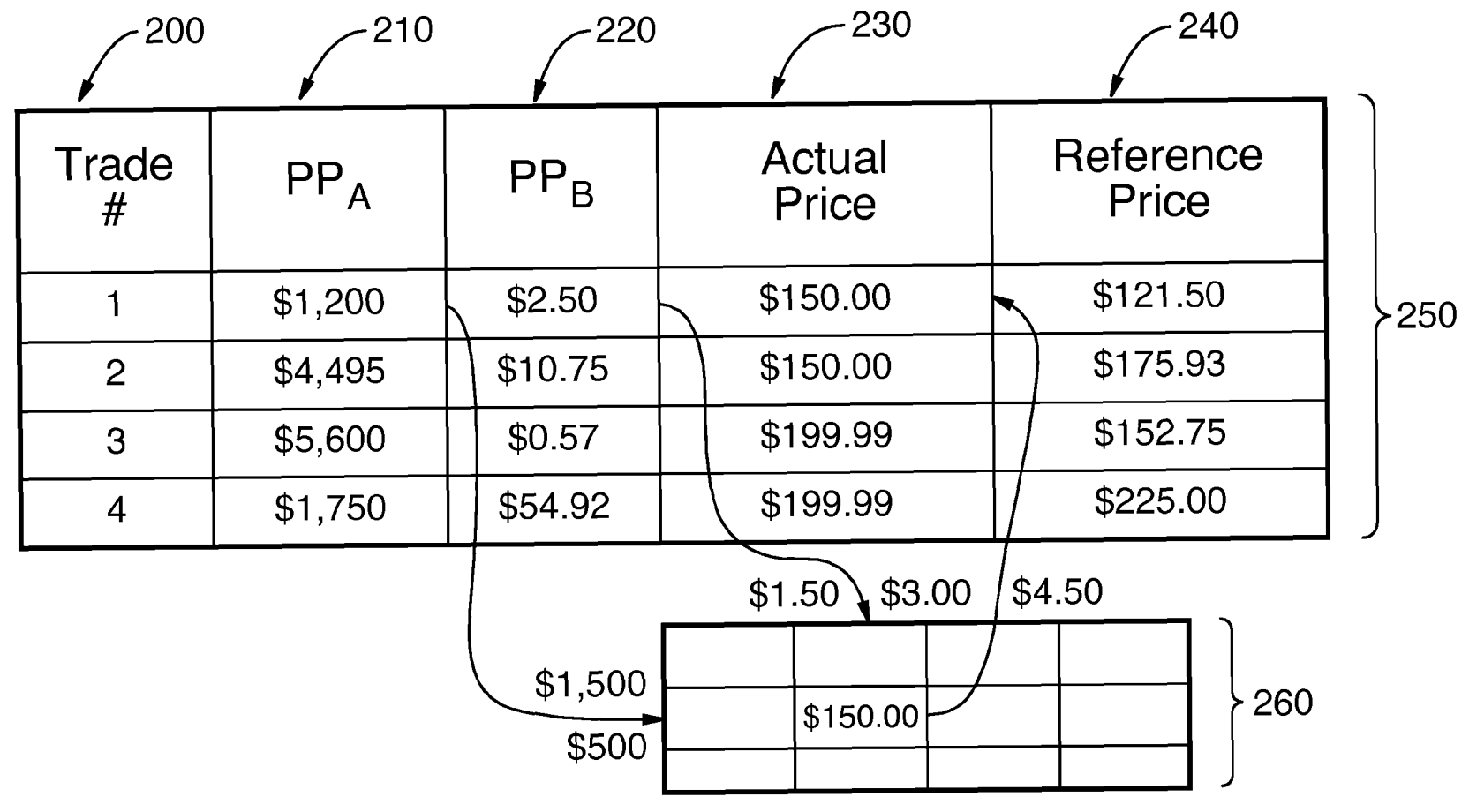

| Trade # | $PP_A$ | $PP_B$ | Actual Price | Reference Price |
|---|---|---|---|---|
| 1 | $1,200 | $2.50 | $150.00 | $121.50 |
| 2 | $4,495 | $10.75 | $150.00 | $175.93 |
| 3 | $5,600 | $0.57 | $199.99 | $152.75 |
| 4 | $1,750 | $54.92 | $199.99 | $225.00 |

REFERENCE PRICE FRAMEWORK

FIELD OF THE INVENTION

The invention relates to pricing methods for transactional and related services or products.

BACKGROUND OF THE INVENTION

In many industries, when a professional provides a transactional service for a client (such as executing a trade in the securities industry), the professional has discretion over the price (i.e. the professional's fee or commission) charged to the client for the service. Ultimately, the price charged by the professional must be within the market-acceptable boundaries, or clients will go elsewhere. However, if the price charged is too low, the professional may have a high volume of trades/transactions, but be in fact a revenue "under-performer".

While the discretion over pricing allows professionals much freedom to reward client loyalty, or encourage new business or more desirable business, many salespeople and sales force managers with such discretion find it a source of difficulty and frustration. In practice, many professionals do not have a reliable sense of how they themselves price transactions and are woefully uninformed as to the pricing behavior of their competitors doing similar transactions for similar clients. In some industries or firms there are "bench-marks" that are commonly used by professionals (with some tinkering to account for differences between their clients, the types of assets being transacted and the types of transactions). However, the bench-marks are often out of date, or out of step with market realities. Ideally, a professional should be able to charge a client "what the market will bear" but this is impossible without accurate and up-to-date information on the state of the market. There is also pressure on professionals in certain industries or particular firms to maximize revenue by charging higher prices. However, with little reliable guidance, it is difficult for a professional to know how to adopt a pricing strategy that is competitive and revenue-maximizing, without losing touch with his own client, asset and transactional variables.

By the same token, firms want to be able to keep tabs on their own professionals and the prices charged for their transactional services with an eye to maximizing revenue and monitoring the "top performers" and "bottom performers" in their organizations. However, the firms also lack a sense of the overall trends in pricing behavior within their organizations and more broadly within their industry. This is exacerbated by the culture of secrecy in some industries (notably, securities) which disdains sharing any pricing information with competitors. Furthermore, some professionals and some industries use complex price formulas which effectively make pricing opaque.

It would be beneficial to provide a method of modeling pricing behavior through "pricing episodes" for particular transactions by particular professionals to assist in evaluating:

(1) professionals on the basis of their own past pricing behavior;
(2) professionals among their peers in a firm, or across firms; and
(3) groups of professionals (e.g. departments or firms or teams) in a larger context (e.g. market-wide).

SUMMARY OF THE INVENTION

According to a first aspect of the invention, a method is provided for computer-assisted modeling using a reference price to assist in evaluating discretionary pricing of transactional services provided by a professional. The method comprises the steps of segmenting a universe of pricing episode data of pricing episodes into a plurality of groupings, delimited by at least one price predictive parameter; the pricing episode data including discretionary prices charged for transactional services provided by the professional; arranging the pricing episode data within each grouping according to the discretionary prices; determining a reference price within each grouping based on a predetermined level, rank or percentile; and using the reference price for evaluating the pricing episode data in the grouping.

Examples of price predictive parameters include time, transaction (or account) type, transaction (or account) size, asset type and account composition.

The predetermined level, rank or percentile may be the median price within the grouping, or some other level, rank or percentile.

The reference price having been established, the pricing episode data may then be arranged within each grouping into a first set having discretionary prices above the reference price and a second set having discretionary prices below the reference price.

Further, a transaction revenue opportunity amount may be determined for any pricing episode data in the second set of each grouping which is the difference between the reference price and the discretionary price multiplied by a volume of the transaction. An overall revenue opportunity amount may be determined which is the sum of all of the transaction revenue opportunity amounts within the grouping.

Any patterns in the distribution of pricing episode data within a grouping may be observed having regard to the reference price, and goal-setting recommendations may be made for future discretionary pricing by the professional based on any observed patterns.

In one embodiment, the discretionary prices may be commissions or fees charged by a salesperson or a broker. The transactional services may be trades in a tradable asset, and the prices may be commissions or fees charged by the salesperson or broker for the trades.

It is important that a representative sample of pricing episodes be present in each grouping. Accordingly, during the segmenting step it may be desirable to determine if there are a pre-selected minimum number of pricing episodes within each grouping before proceeding to the next step. If there are less than the minimum number of pricing episodes, it may be desirable to re-segment the universe.

According to a second aspect of the invention, a method of computer-assisted modeling is provided using a reference price to assist in evaluating discretionary pricing of transactional services provided by a target professional in contrast with a group of professionals. The method comprises the steps of segmenting a universe of pricing episode data of pricing episodes into a plurality of groupings, delimited by at least one price predictive parameter; the pricing episode data including discretionary prices charged for transactional services provided by the group of professionals, including the target professional; arranging the pricing episode data for the group of professionals within each grouping according to the discretionary prices; determining a reference price within each grouping based on a predetermined level, rank or percentile; and using the reference price for evaluating the pricing episode data of the target professional.

The predetermined level, rank or percentile may be the median price within the grouping, or some other level, rank or percentile.

The reference price having been established, the pricing episode data for the target professional may be divided within each grouping into a first set having discretionary prices above the reference price and a second set having discretionary prices below the reference price. Further, a transaction revenue opportunity amount may be determined for any pricing episode data of the target professional in the second set of each grouping, which is the difference between the reference price and the discretionary price multiplied by the volume of the transaction. An overall revenue opportunity amount may be determined for any grouping, which is the sum of all of the transaction revenue opportunity amounts for the target professional within the grouping.

Any patterns in the distribution of pricing episode data within a grouping may be observed having regard to the reference price, and goal-setting recommendations may be made for future discretionary pricing by the target professional based on any observed patterns. Likewise, the distribution of pricing episode data for the target professional may be contrasted with the distribution of pricing episode data for the group of professionals.

The professionals may be individuals or groups or departments or firms for the purpose of the comparison.

In one embodiment, the discretionary prices are commissions or fees charged by salespersons or brokers. The transactional services may be trades in at least one type of tradable asset.

BRIEF DESCRIPTION OF THE FIGURES

FIG. 3 is an illustrative example of pricing episode data for a professional in contrast to reference prices for individual trades.

DETAILED DESCRIPTION OF THE FIGURES

The invention builds on a central idea that a "reference price" can be used as a bench-mark for evaluating discretionary pricing for transactional services by professionals and groups of professionals. The reference price is determined by identifying a level, rank or percentile that is considered to be indicative of what the market will bear, or alternatively, what price the class of buyers should be willing to accept. For the purpose of illustration in the present application, median is used as the basis for determining "reference price", building on the belief that a professional could reasonably aim to be "above average" in his pricing. However, it will be understood that other levels, ranks or percentiles (e.g. top quartile, quintile or decile) can equally be used to determine a reference price with the overarching qualification that the reference price should be simple and transparent, so that comparisons are easily understood.

The starting point is a set of data (a "universe") which represents pricing episodes by a group of professionals or a single professional over a period of time or in some other selected category (e.g., a peer group, a department, a firm, a region).

Each "pricing episode" is associated with a little bundle of data for a given transaction or service rendered:

Who did the transaction (i.e. what professional)—and any other professional particulars believed to be relevant (e.g. the department and firm);

Who was the transaction for (i.e. which client or account)—and where is the client located, in which household, etc.;

When did the transaction occur or when was the transactional service rendered;

What was transacted—i.e. type of asset, value, volume, other particulars of service rendered;

What was the price charged by the professional for the transactional service—whether flat fee, %, $ per volume or per hour.

The universe of the pricing episode data is then segmented according to one or more price predictors. The "price predictors" are variables or characteristics that are hypothesized to have some effect on pricing behavior. Examples might include specific asset, account or client attributes (e.g. volume of asset purchased, type of asset, scarcity, value).

Figure 1:
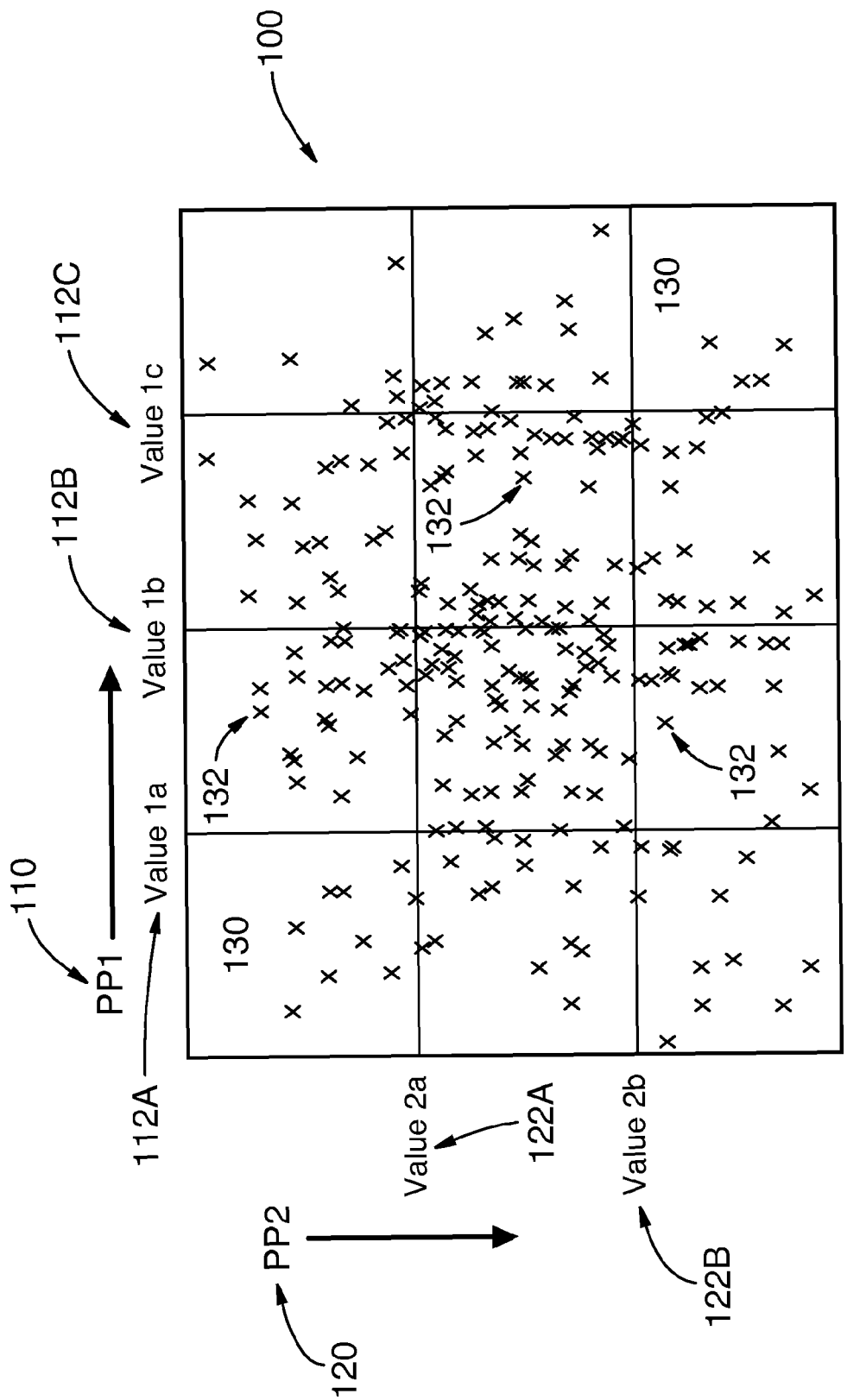
FIG. 1 is a graph of a sample distribution of pricing episode data within a sample matrix segmented by price predictors (PP1, PP2).

As shown in FIG. 1, the pricing episode data falls into the segmented price predictive groupings in a matrix 100 set by the two price predictors (PP1, PP2) 110, 120. The groupings are bounded by breakpoints (shown as 112A, 112B, 112C for PP1 (110); and 122A, 122B for PP2 (120) in FIG. 1). The breakpoints will typically be numerical limits, but may instead be other kinds of categories. The breakpoints are selected so as to ensure that each grouping 130 has a representative sample of pricing episode data 132. For instance, it might be desirable to allow no fewer than 10 pricing episodes 132 in each grouping. If there are less than 10, the breakpoints might be re-set and the segmenting re-established.

Figure 2:
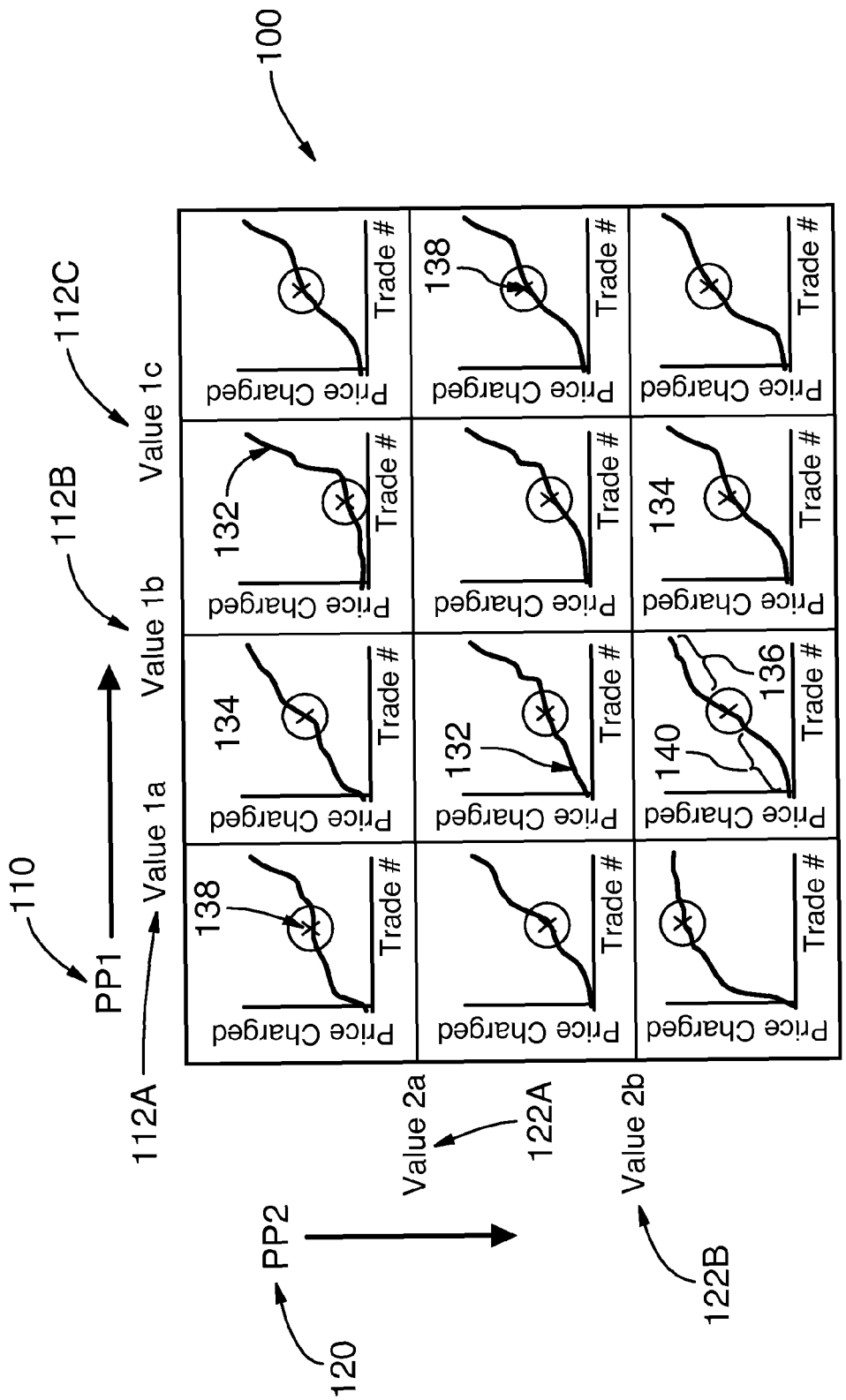
FIG. 2 is a graph of a sample arrangement of the pricing episode data according to price, showing a reference price identified within each segmented grouping (in this case, the median price).

FIG. 2 shows the arrangement of pricing episode data 132 in each grouping. The pricing episodes 132 are arranged in a linear fashion 134 high-to-low or low-to-high (by price) in each grouping. As illustrated in FIG. 2, this linear representation of the data will indicate certain patterns or trends within each grouping. The linear arrangement also allows for the determination of the reference price 138 in each grouping (i.e. the price occurring at the desired level, rank or percentile in each arranged grouping 134). For this example, the reference price is taken to be the median price.

The reference price 138 allows the linear arrangement 134 of pricing episodes 132 to be divided into those above 136 the reference price 138 and those below 140 the reference price 138. If the pricing episodes of a given "target" professional (or target group) are then isolated out of the mass, each of these pricing episodes can be compared against the reference price (above or below) in a particular grouping. Where the price charged by the professional (the discretionary price or actual price) was below the reference price, a revenue opportunity can also be identified, which is:

Revenue Opportunity=(Reference Price−Price Charged)*Volume  (Eq. 1)

The revenue opportunity amounts can also be summed together for a given professional (or group) in a single grouping or across all of the groupings. Thus, the professional using the modeling method can identify where he is pricing "below reference" (i.e. below market) and can identify the "lift" or "opportunity" that would be generated by pricing at the reference price.

FIG. 3 shows an illustrative example of the comparison with actual pricing episode data (in this case "Trades" 200). As shown in comparison matrix 250, two Price Predictors $PP_A$ 210 and $PP_B$ 220 were used to segment the universe of pricing episode data. Assume for the purpose of the example that these are:

$PP_A$=overall value of trade $PP_B$=value per share

The price charged by the professional to execute Trade #1 was $150. This information was retrieved from the segmented universe matrix 260 where the $PP_A$ ($1200) and $PP_B$ ($2.50) were located within their delimited grouping (shaded region shown in matrix 260). The Reference Price 240 is taken from the median of all of the prices in that grouping (in this case, $121.50). As the Actual Price exceeds the Reference Price, Trade #1 was priced "above reference" (i.e. above market).

To determine the revenue opportunity for this set of pricing episode data (Trades #1-4), the instances where actual price was below reference price would be isolated (in this case, Trades #2 and 4). For each of these instances, the difference would be calculated between actual and reference price:

Revenue Opportunity$_{T2}$=$175.93–$150.00=$25.93

Revenue Opportunity$_{T4}$=$225.00–$199.99=$25.01

Sum of (Revenue Opportunity$_{T2}$+Revenue Opportunity$_{T4}$)=$50.94

The overall revenue opportunity for this example would be $50.94 (times the volume of the trades $T_2$ and $T_4$). This is an illustration of the amount of revenue "lost" by pricing under the reference price. It is also a data-based illustration of where pricing revenues could be improved (i.e. where "opportunities" exist).

The use of a reference price could also be applied to an entire universe of data (not previously segmented into groupings). However, the groupings allow like transactions to be compared. For instance, a high-value transaction may be compared against other high-value transactions, or transactions with similar types of assets (e.g. early maturing or late maturing bonds) may be compared.

Furthermore, it will be appreciated that while many of the examples referred to in the description relate to securities concepts (trades, brokers, etc.), the modeling method works equally well for other types of discretionary pricing for transactions (e.g. legal services provided by professionals which are priced within the discretion of the professional) or other services rendered by similar types of professionals (e.g. financial advisors, planners, insurance salespeople). The method works best where there are a number of comparable factors between the professionals and their pricing episodes to permit drawing conclusions.

The invention is designed to be carried out using software run on a computer or computer network, using standard databases and hardware. Preferably, the software generates reports to illustrate pricing episode data in both summarized and detailed forms.

The foregoing description illustrates only certain preferred embodiments of the invention. The invention is not limited to the foregoing examples. That is, persons skilled in the art will appreciate and understand that modifications and variations are, or will be, possible to utilize and carry out the teachings of the invention described herein. Accordingly, all suitable modifications, variations and equivalents may be resorted to, and such modifications, variations and equivalents are intended to fall within the scope of the invention as described and within the scope of the claims.

The invention claimed is:

1. A method of computer-assisted modeling using a reference price to assist in evaluating discretionary pricing of transactional services provided by a professional, the method comprising:

retrieving, by a computer, a universe of pricing episode data of pricing episodes for a transaction from a database;

segmenting, by the computer, the universe of pricing episode data of pricing episodes for the transaction into a plurality of groupings, delimited by at least one price predictive parameter; the price predictive parameter being related to time of transaction, type of transaction, customer or customer type, asset or asset type, account or account type or composition; the pricing episode data including discretionary prices chargeable by and within the discretion of the professional for transactional services provided by the professional;

ranking, by the computer, the pricing episode data within each grouping according to the discretionary prices;

choosing, by the computer, a reference price from among the ranked discretionary prices within each grouping based on a predetermined level, rank or percentile;

dividing, by the computer, the pricing episode data arranged within each grouping into a first set having discretionary prices above the reference price and a second set having discretionary prices below the reference price; and determining, by the computer, for any pricing episode data in the second set of each grouping, a transaction revenue opportunity amount, comprising the difference between the reference price and the discretionary price multiplied by a volume of the transaction.

2. The method of claim 1, wherein the predetermined level, rank or percentile comprises the median price within the grouping.

3. The method of claim 1, wherein the method further comprises:

determining, by the computer, for any grouping, an overall revenue opportunity amount, comprising the sum of all of the transaction revenue opportunity amounts within the grouping.

4. The method of claim 1, wherein the method further comprises:

observing, by the computer, any patterns in the distribution of pricing episode data within a grouping having regard to the reference price; and providing, by the computer, at least one goal-setting recommendation for future discretionary pricing by the professional based on any observed patterns.

5. The method of claim 1, wherein the discretionary prices are commissions or fees charged by a salesperson or a broker.

6. The method of claim 1, wherein the transactional services are trades in a tradable asset, the professional is a salesperson or broker, and the prices are commissions or fees charged by the salesperson or broker for the trades.

7. The method of claim 1, wherein the segmenting step further comprises:

determining, by the computer, when there are a pre-selected minimum number of pricing episodes within each grouping before proceeding to the next step, and when there are less than the minimum number of pricing episodes, re-segmenting, by the computer, the universe based on a different at least one parameter.

8. A non-transitory computer readable medium having instructions stored thereon, said instructions operable to cause a computer to:

retrieve a universe of pricing episode data of pricing episodes for a transaction from a database;

segment the universe of pricing episode data of pricing episodes into a plurality of groupings, delimited by at least one price predictive parameter; the price predictive parameter being related to time of transaction, type of transaction, customer or customer type, asset or asset type, account or account type or composition; the pricing episode data including discretionary prices chargeable by and within the discretion of the professional for transactional services provided by the professional;

rank the pricing episode data within each grouping according to the discretionary prices;

choose a reference price from among the ranked discretionary prices within each grouping based on a predetermined level, rank or percentile;

divide the pricing episode data arranged within each grouping into a first set having discretionary prices above the reference price and a second set having discretionary prices below the reference price; and determine, for any pricing episode data in the second set of each grouping, a transaction revenue opportunity amount, comprising the difference between the reference price and the discretionary price multiplied by a volume of the transaction.

9. The non-transitory computer readable medium of claim 8, wherein the predetermined level, rank or percentile comprises the median price within the grouping.

10. The non-transitory computer readable medium of claim 8, said instructions further operable to cause the computer to determine, for any grouping, an overall revenue opportunity amount, comprising the sum of all of the transaction revenue opportunity amounts within the grouping.

11. The non-transitory computer readable medium of claim 8, said instructions further operable to cause the computer to observe any patterns in the distribution of pricing episode data within a grouping having regard to the reference price; and provide at least one goal-setting recommendation for future discretionary pricing by the professional based on any observed patterns.

12. The non-transitory computer readable medium of claim 8, wherein the discretionary prices are commissions or fees charged by a salesperson or a broker.

13. The non-transitory computer readable medium of claim 8, wherein the transactional services are trades in a tradable asset, the professional is a salesperson or broker, and the prices are commissions or fees charged by the salesperson or broker for the trades.

14. The non-transitory computer readable medium of claim 8, wherein segmenting the universe further comprises:

determining when there are a pre-selected minimum number of pricing episodes within each grouping before proceeding to the next step, and when there are less than the minimum number of pricing episodes, re-segmenting the universe based on a different at least one parameter.

15. A system of computer-assisted modeling using a reference price to assist in evaluating discretionary pricing of transactional services provided by a professional, the system comprising:

a computer configured to:

retrieve a universe of pricing episode data of pricing episodes for a transaction from a database;

segment the universe of pricing episode data of pricing episodes into a plurality of groupings, delimited by at least one price predictive parameter; the price predictive parameter being related to time of transaction, type of transaction, customer or customer type, asset or asset type, account or account type or composition; the pricing episode data including discretionary prices chargeable by and within the discretion of the professional for transactional services provided by the professional;

rank the pricing episode data within each grouping according to the discretionary prices;

choose a reference price from among the ranked discretionary prices within each grouping based on a predetermined level, rank or percentile;

divide the pricing episode data arranged within each grouping into a first set having discretionary prices above the reference price and a second set having discretionary prices below the reference price; and determine, for any pricing episode data in the second set of each grouping, a transaction revenue opportunity amount, comprising the difference between the reference price and the discretionary price multiplied by a volume of the transaction.

16. The system of claim 15, wherein the predetermined level, rank or percentile comprises the median price within the grouping.

17. The system of claim 15, the computer further configured to determine, for any grouping, an overall revenue opportunity amount, comprising the sum of all of the transaction revenue opportunity amounts within the grouping.

18. The system of claim 15, the computer further configured to observe any patterns in the distribution of pricing episode data within a grouping having regard to the reference price; and provide at least one goal-setting recommendation for future discretionary pricing by the professional based on any observed patterns.

19. The system of claim 15, wherein the discretionary prices are commissions or fees charged by a salesperson or a broker.

20. The system of claim 15, wherein the transactional services are trades in a tradable asset, the professional is a salesperson or broker, and the prices are commissions or fees charged by the salesperson or broker for the trades.

21. The system of claim 15, wherein segmenting the universe further comprises:

determining when there are a pre-selected minimum number of pricing episodes within each grouping before proceeding to the next step, and when there are less than the minimum number of pricing episodes, re-segmenting the universe based on a different at least one parameter.

* * * * *